(12) United States Patent
Fernandez

(10) Patent No.: US 9,926,905 B2
(45) Date of Patent: Mar. 27, 2018

(54) SYSTEM FOR CONVERTING ACCELERATION TO ROTATIONAL ENERGY

(71) Applicant: Jorge Pablo Fernandez, Miami Beach, FL (US)

(72) Inventor: Jorge Pablo Fernandez, Miami Beach, FL (US)

( * ) Notice: Subject to any disclaimer, the term of this patent is extended or adjusted under 35 U.S.C. 154(b) by 0 days.

(21) Appl. No.: 15/479,115

(22) Filed: Apr. 4, 2017

(65) Prior Publication Data

US 2018/0051668 A1    Feb. 22, 2018

Related U.S. Application Data

(63) Continuation-in-part of application No. 15/002,554, filed on Jan. 21, 2016, now abandoned.

(51) Int. Cl.
| | |
|---|---|
| *F03B 17/02* | (2006.01) |
| *F04D 13/02* | (2006.01) |
| *F04D 25/02* | (2006.01) |
| *F16H 19/04* | (2006.01) |
| *F16H 19/06* | (2006.01) |

(52) U.S. Cl.
CPC ............ *F03B 17/025* (2013.01); *F04D 13/02* (2013.01); *F04D 25/02* (2013.01); *F05B 2220/7064* (2013.01); *F05B 2270/18* (2013.01); *F05B 2270/821* (2013.01); *F16H 19/04* (2013.01); *F16H 19/06* (2013.01)

(58) Field of Classification Search
CPC ........ Y02E 10/20; F03B 17/005; F03B 17/02; F03B 17/025; F03B 17/04; F03B 17/00; F03B 9/00; F03B 9/005; F03B 11/002; F03B 13/00; F03G 3/00

USPC ..................................... 60/495, 496, 500, 505
See application file for complete search history.

(56) References Cited

U.S. PATENT DOCUMENTS

| | | | | |
|---|---|---|---|---|
| 6,009,707 A * | 1/2000 | Alkhamis | ............... | F03B 17/02 60/398 |
| 6,018,947 A * | 2/2000 | DeMarco | ................ | F03B 17/02 60/496 |
| 6,546,726 B1 * | 4/2003 | Tomoiu | .................... | F03B 17/02 60/495 |
| 8,024,927 B1 * | 9/2011 | Azizi | ...................... | F03B 17/02 290/1 R |
| 8,397,497 B2 * | 3/2013 | Cucurella Ripoli | | F03B 13/1815 290/42 |

(Continued)

*Primary Examiner* — Mark Laurenzi
*Assistant Examiner* — Mickey France
(74) *Attorney, Agent, or Firm* — Sanchelima & Associates, P.A.; Christian Sanchelima, Esq.; Jesus Sanchelima, Esq.

(57) ABSTRACT

A system that converts acceleration to rotational energy by using gravity to lower a ballast member and buoyancy to raise it when the ballast member is filled with compressed air. The ballast's initial ascent is controlled by a brake member. This ascent causes a rack assembly to rise that actuates a compressor to refill the intermediary tank with compressed air so the cycle can repeat itself. The initial phase begins with the ballast member containing compressed air so it can ascend up a liquid-filled silo, generating rotational energy along the way using a mounted cable that travels around a wire drum. Upon reaching the top of the silo, valves will open allowing water to enter the ballast thereby sinking it to the bottom, creating additional rotational energy.

17 Claims, 18 Drawing Sheets

(56) References Cited

U.S. PATENT DOCUMENTS

| | | | | |
|---|---|---|---|---|
| 8,456,027 B1 * | 6/2013 | Seehorn | H02K 7/1823 | 290/1 R |
| 8,796,870 B2 * | 8/2014 | Cheung | F03B 17/04 | 290/1 R |
| 8,813,488 B2 * | 8/2014 | Gibson | F03B 17/02 | 60/496 |
| 9,234,495 B2 * | 1/2016 | Anteau | F03B 17/025 | |
| 9,243,609 B2 * | 1/2016 | Dunn | F03B 17/025 | |
| 9,267,489 B2 * | 2/2016 | Kim | F03B 17/02 | |
| 2005/0188691 A1 * | 9/2005 | Uhl | F03B 17/025 | 60/495 |
| 2006/0017292 A1 * | 1/2006 | Matsubara | F03B 17/025 | 290/43 |
| 2006/0168953 A1 * | 8/2006 | Carter | F03B 17/04 | 60/392 |
| 2006/0267346 A1 * | 11/2006 | Chen | F03B 17/04 | 290/54 |
| 2007/0080540 A1 * | 4/2007 | Tung | F03B 17/04 | 290/43 |
| 2008/0289324 A1 * | 11/2008 | Marion | F03B 17/02 | 60/407 |
| 2009/0293471 A1 * | 12/2009 | Davis | F03B 17/00 | 60/495 |
| 2010/0283261 A1 * | 11/2010 | Ryan | F03B 17/04 | 290/1 R |
| 2011/0126538 A1 * | 6/2011 | Kim | F03G 3/00 | 60/639 |
| 2011/0221209 A1 * | 9/2011 | Ryan | F03B 17/04 | 290/1 R |
| 2012/0060489 A1 * | 3/2012 | Rizzi | F03B 11/002 | 60/496 |
| 2013/0167529 A1 * | 7/2013 | Camacho Munoz | F03B 17/025 | 60/639 |
| 2013/0270835 A1 * | 10/2013 | Pingitore | F03B 17/005 | 290/1 A |
| 2014/0130497 A1 * | 5/2014 | Anteau | F03B 17/005 | 60/639 |
| 2015/0167627 A1 * | 6/2015 | Villanueva, Jr. | F03B 17/025 | 290/1 C |
| 2015/0330357 A1 * | 11/2015 | Saxe | F03G 7/06 | 60/496 |

* cited by examiner

| Wire Drum Radius | Wire Drum RPM | Wire Drum Output Torque | Cycle Time | Ballast Velocity |
|---|---|---|---|---|
| 100 Inches | 0.194 RPM | 8333.3 ftlbs | 32 minutes | 2.03 inches per second |
| 135 Inches | 0.144 RPM | 11250 ftlbs | 32 minutes | 2.03 inches per second |
| 165 Inches | 0.117 RPM | 13750 ftlbs | 32 minutes | 2.03 inches per second |
| 200 Inches | 0.097 RPM | 16666.7 ftlbs | 32 minutes | 2.03 inches per second |
| 235 Inches | 0.082 RPM | 19583.3 ftlbs | 32 minutes | 2.03 inches per second |
| 265 Inches | 0.073 RPM | 22083 ftlbs | 32 minutes | 2.03 inches per second |

SYSTEM FOR CONVERTING ACCELERATION TO ROTATIONAL ENERGY

OTHER RELATED APPLICATIONS

The present application is a continuation-in-part of U.S. patent application Ser. No. 15/002,554, filed on Jan. 21, 2016, which is hereby incorporated by reference.

BACKGROUND OF THE INVENTION

Field of the Invention

The present invention relates to a system for converting acceleration to rotational energy to actuate various devices or assemblies.

Description of the Related Art

Several designs for converting acceleration to rotation have been designed in the past. None of them, however, include a first piston using pneumatic pressure to actuate the rising of a second piston having sensors to coordinate the opening and closing of its valves as it travels in a liquid-filled tank to generate force, which is converted to electricity.

Applicant believes that a related reference corresponds to U.S. patent application Ser. No. 11/790,498 filed on Apr. 26, 2007 issued to Jui-Chi Tung for a hydraulic buoyancy kinetic energy apparatus. However, it differs from the present invention because the Tung reference requires a water supply source to keep the water level high whereas the present invention reuses the same water supply, eliminating the need for a water source to be continuously operating. Also, the Tung reference requires both pistons to be located within the same water tank, thereby requiring more water and a larger tank than the present invention. Applicant is able to achieve the desired result with one ballast instead of two. The Tung reference further requires a larger tank than the present invention, which creates additional complexity leading to added material costs and potential breakdowns.

Other documents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a system for converting acceleration to rotational energy from the rising of a ballast.

It is yet another object of this invention to convert acceleration to rotational energy to power a centrifugal blower, centrifugal pump, or alternator without requiring an external energy source other than acceleration, thereby reducing costs and emissions.

It is another object of this invention to provide a system for converting acceleration to rotational energy using a computerized system that coordinates the opening and closing of the ballast's valves using a plurality of sensors to maximize the system's efficiency.

It is still another object of the present invention to provide a system for converting acceleration to rotational energy that can recycle its water supply to avoid needing a water source continuously connected to the system, thereby saving thousands of gallons of water, which would otherwise be processed and contaminated. This reduces costs and benefits the environment.

It is yet another object of this invention to provide such a system that is cost-efficient to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

In FIG. 1 ballast assembly 20 can be seen filled with water since valves 24; 24a were opened upon ballast assembly 20 reaching the top of the silo to allow water in to sink the ballast back to the bottom in preparation for the next cycle.

FIG. 8 shows the continued descent of ballast member 22 within silo 42 and latches 27; 27a ready to reengage anchoring members 104; 104a.

FIG. 4 and FIG. 5 show the process by which the intermediary tank is refilled.

FIG. 18 shows a power output conversion table.

Figure 1:
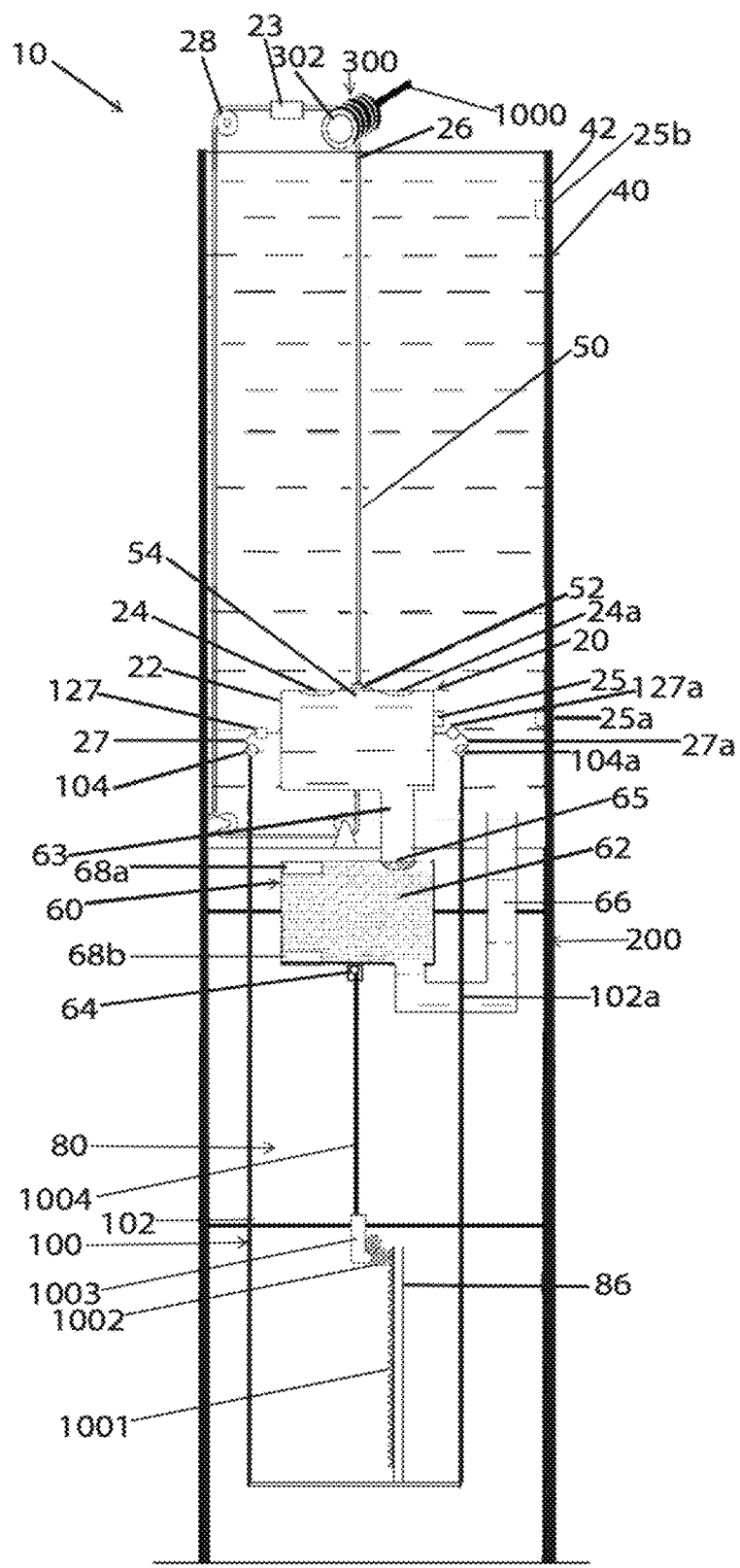
FIG. 1 represents front elevational view of the present system in its operating environment after the initial phase. In its initial phase ballast assembly 20 is filled with compressed air since that is how it is manufactured.
Figure 2:
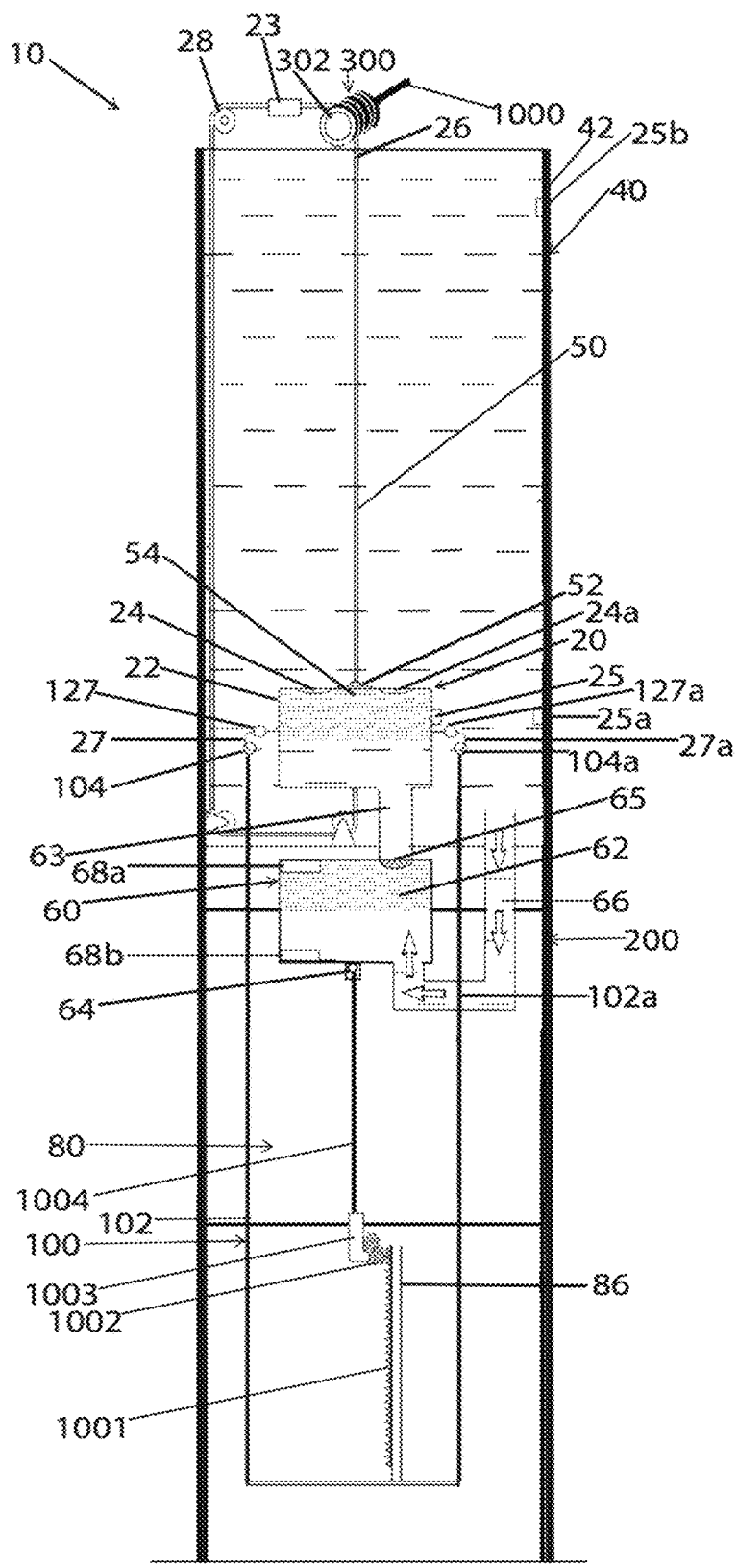
FIG. 2 shows the beginning of the next cycle as ballast member 22 is still partially filled with water but compressed air from intermediary tank assembly 60 is being delivered to ballast assembly 20. J-pipe 66 is seen allowing water into intermediary tank assembly 60 as compressed air has left its inner space.
Figure 3:
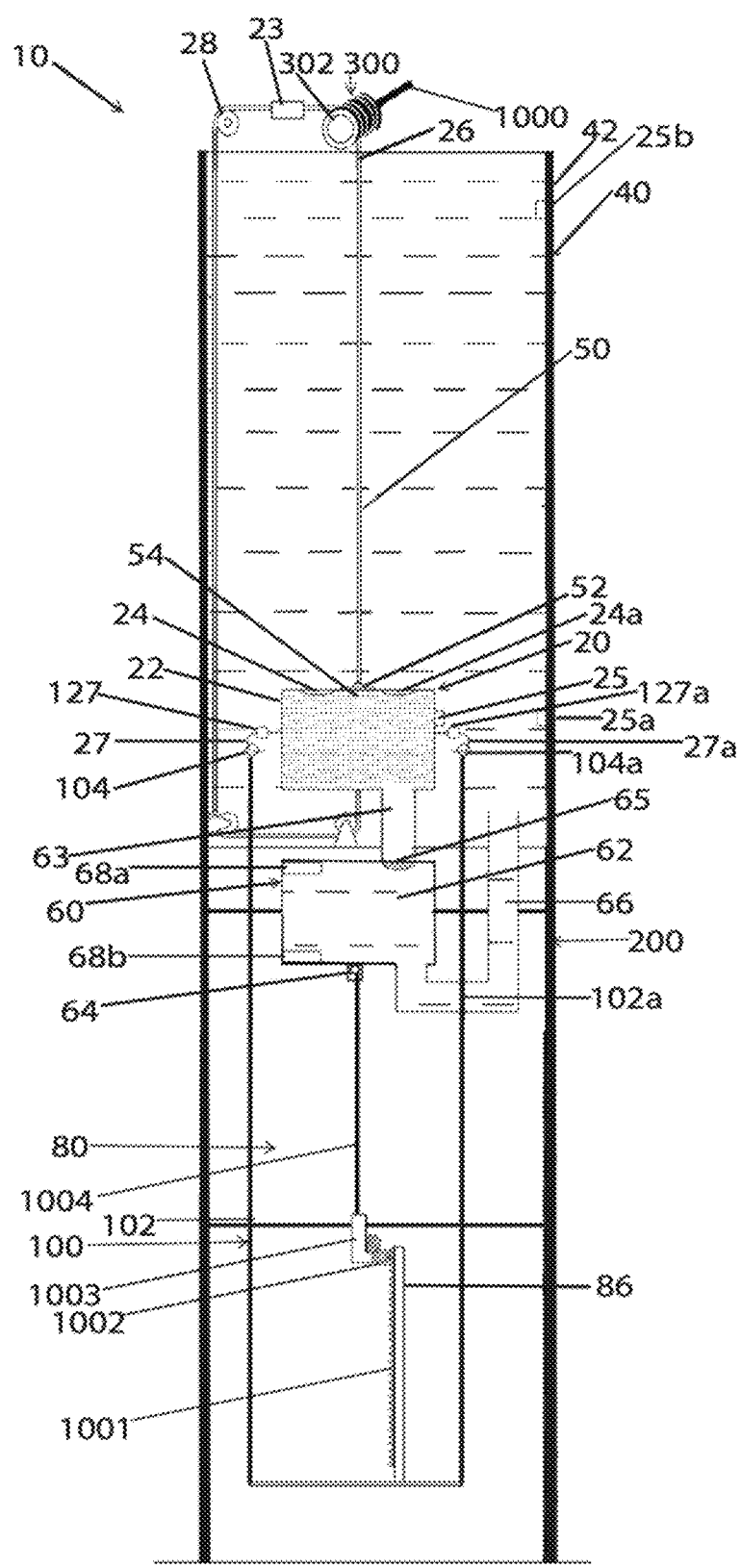
FIG. 3 is a front elevational view showing ballast member 22 completely refilled with compressed air and intermediary tank 62 filled with water.

DETAILED DESCRIPTION OF THE
EMBODIMENTS OF THE INVENTION

Referring now to the drawings, where the present invention is generally referred to with numeral 10, it can be observed that it basically includes ballast assembly 20 that can be a square or rectangular shape and its bottom end is open. Ballast assembly 20 can begin in its initial position already filled with compressed air. It can be manufactured that way. Ballast assembly 20 includes ballast member 22, upper valves 24; 24a and latch members 27; 27a, which are powered using motors 124; 124a. In one embodiment, motors 124; 124a can be powered by alternating current. In yet another the motors can be powered using direct current. The ballast assembly 20 is positioned inside a silo assembly 40 that is filled with liquid.

Within silo assembly 40 a cable 50 runs down the height of the silo assembly 40 and its first end 52 is mounted at the top of ballast assembly 20 and winds around rotational assembly 300 what includes wire drum 302. The rotation of wire drum 302 can be used to rotate shaft 1000 that in turn can be used to actuate various instruments and/or equipment such as an alternator, a fan, or a pump. The present invention can be understood to act as an educational device for the purposed of teaching how the acceleration from gravity as the ballast member 22 drops, or its buoyancy as it rises, can be converted to rotational energy. This can be practical when harnessing wasted energy from outside processes. The wasted energy can be transferred to acceleration which can then be transferred to rotational energy using the present invention.

Ballast assembly 20 includes sensors 25 that detect when ballast assembly 20 is at the top and bottom of the silo assembly 40. When sensor 25 detects sensor 25b the system knows that ballast member 22 has reached the top of the silo 42. The system will open valves 24; 24a allowing water to enter ballast assembly 20 and sink it to the bottom of silo assembly 40. Cable 50 includes second end 54 that is mounted within ballast member 20 at its top wall opposite first end 52 after the cable 50 was wrapped around wire drum 302 and passed through a plurality of pulleys 28. In one embodiment, first end 52 does not meet with second end 54. Anchoring members 104; 104a are mounted at the distal ends of rods 102; 102a of rack assembly 100. The bottom of rack assembly 100 includes a rack 1001 that cooperates with transmission member 1002 that in turn is fixed to the air compressor 1003. In one embodiment, air compressor 1003 can be stationary and rack 1001 moves up against transmission 1002 that in turn actuates the compressor to deliver compressed air into pipe 1004.

The system also includes intermediary tank assembly 60 that includes upper valve 65, connecting pipe 63 that allows compressed air to travel between intermediary tank assembly 60 and ballast assembly 20. Intermediary tank assembly 60 can be manufactured with compressed air, ambient air, or liquid.

Upper valve 65 can be a one-way valve and is opened to allow compressed air inside of ballast assembly 20 when ballast assembly 20 is locked at the bottom of silo assembly 40. Latches 27; 27a engage anchoring members 104; 104a upon sensor 25 reaching the level of sensor 25a. In addition, prior to upper one-way valve 65 opening, brake 23 must be locking cable 50 thereby preventing any movement of cable 50 and in turn ballast member 22. Intermediary tank 60 assembly includes J-Pipe 66 that connects intermediary tank assembly 60 to silo assembly 40 and allows water to flow in and out of intermediary tank assembly 60.

Intermediary tank 60 also includes bottom valve 64 that can be a one-way valve that when opened allows compressed air to enter from air compressor 1003 via pipe 1004. Intermediary tank assembly 60 also includes upper and lower float sensor 68a; 68b, respectively, housed therein. In its initial cycle the ballast assembly 20 begins at the bottom of silo 60 filled with compressed air. Brake 23 is released a predetermined amount allowing ballast assembly 20 to rise. Since latches 27; 27a are still engaged with anchoring members 104; 104a the buoyancy associated with the ballast's rise causes rack assembly 100 to rise as well as brake 23 is gradually released to allow ballast member 22 to rise. As rack 1001 rises it actuates transmission 1002, which in turn actuates compressor 1003 to release compressed air into intermediary tank assembly 60.

Lower float sensor 68b detects when the liquid has been replaced by the compressed air. At this point, latches 27; 27a are disengaged from anchoring members 104; 104a thereby preventing any further compressed air from exiting compressor 1003. Rack assembly 100 is now permitted to drop into its initial position again. When top sensor 25b detects sensor 25 indicating that ballast assembly 20 has reached the top of the silo 42, valves 24; 24a will open allowing water in and the ballast will drop. At this point, the intermediary tank 60 is filled with compressed air and rack assembly 100 has been lowered. When sensors 25 and 25a align indicating that the ballast is at the bottom of the silo, latches 27; 27a reengage anchoring members 104; 104a and brake 23 also reengages to lock cable 50. When brake 23 reengages, valve 65 is actuated to release the compressed air inside intermediary tank 60 through pipe 63 and back into ballast assembly 20. At this point rack assembly 100 remains in the lowered position.

Upon the compressed air being delivered to ballast assembly 20 through pipe 63, water will enter intermediary tank 60 through J-Pipe 66. When upper float sensor 68a detects that intermediary tank 60 is filled with water, the system will again begin to release brake 23 causing the ballast to rise and now rack assembly 100 rises again and actuates the compressor 1003 to refill the intermediary tank 60 using transmission 1002 and push the water out of J-Pipe 66.

Compressed air is delivered to intermediary tank assembly 60 until lower float sensor 68b again detects that there is not enough liquid left because it is filled with compressed air. While intermediary tank 60 is being filled with compressed air, ballast assembly 20 is traveling upwards through silo assembly 40 as brake 23 allows. Brake 23 is controlled by the control unit that synchronizes all the sensors and valves of the system. Alternatively, brake 23 and the sensors and valves can be controlled manually. When ballast assembly 20 again reaches the bottom and latches members 24; 24a and brake 23 engage, ballast assembly 20 can be immediately refilled with the compressed air that was stored in intermediary tank 60. The process continues to repeat itself. Latch members 27; 27a can also be hooks or any other means for anchoring the ballast member 22 to the rack assembly 100.

While ballast member 22 is traveling up the silo member 42 cable 50 is rotating around drum 302 thereby converting the acceleration of the ballast member 22 to rotation energy. Also, when ballast member 22 is descending within silo member 42 cable 50 is also causing drum 302 to rotate converting the acceleration of ballast member 22 to rotation energy.

The system begins operations with air inside the intermediary tank and ballast tank. This prefilling is done as part of the manufacturing process of the machine, and this initial filling of compressed air occurs once and only the date of the machine manufacture. The machine is manufactured to begin functioning in the condition observed in FIG. 5 of the drawings. For the following example of functionality, variables will be provided for every relevant force involved in the process of the machine, and for simplicity are cited below;

a). Force of Gravity=9.807 meters per second$^2$
b). Weight of a Meter cubed of water=997.1 Kilo Gram
c). Height of the Water Tank=99 meters
d). Volumetric Capacity of the Ballast=$10^3$ meter
e). 1 Atmosphere of pressure=14.695 pounds per square inch
f). 1 Atmosphere underwater occurs every=10.339 meters During this phase the air filled ballast is released from the latching assembly and rises, transferring power from the Ballast's positive buoyancy to the power output shaft, for use in whatever system the output shaft is connected to. This phase can go on for as long as is required the per the requirements of the system to which it is connected. The system's output can be modulated by modifying the speed at which the Ballast rises through the partial engagement of the brake. It can operate in slow cycles for use in electrical generation, or in fast cycles for use in high demand situations. However, the output speed of the rising ballast is limited by the water resistance around the ballast when it rises, promoting it's use for more torque intensive procedures. Upon the ballast reaching the top of the tank, valves on it's topmost position are opened. This lets out any air contained within it's chamber allowing it to descend to the bottom of the tank.

The ballast refilling phase has three distinct stages labeled A, B, and C respectively.

A: The ballast has just reached the bottom of the tank and has latched onto the assembly, also the brake is fully engaged, thus preventing the ballast from moving.

B: The remote valve located in between the intermediary tank and the ballast tank is opened, allowing an exchange of air and water to take place between the intermediary tank and the ballast. Water can be seen entering the intermediary tank from the main tank by the presence of arrows in the J-pipe. Water enters the chamber through the J-Pipe and pushes the air from the intermediary tank into the ballast tank.

C: Illustrates the finished exchange, specifically, the air filled ballast and the water filled intermediary tank.

Intermediary Refilling Phase:

The intermediary refilling phase is powered by the positive buoyancy of the ballast, 9946 Kg of buoyance respectively. The bottommost point of the tank is 100 meters, specifically, 99 meters for the height of the tank, and 1 meter for the height of the intermediary tank. Under 100 meters of fresh water, the total pressure equals 9.672 atmospheres or 142.121 psi.

Figure 4:
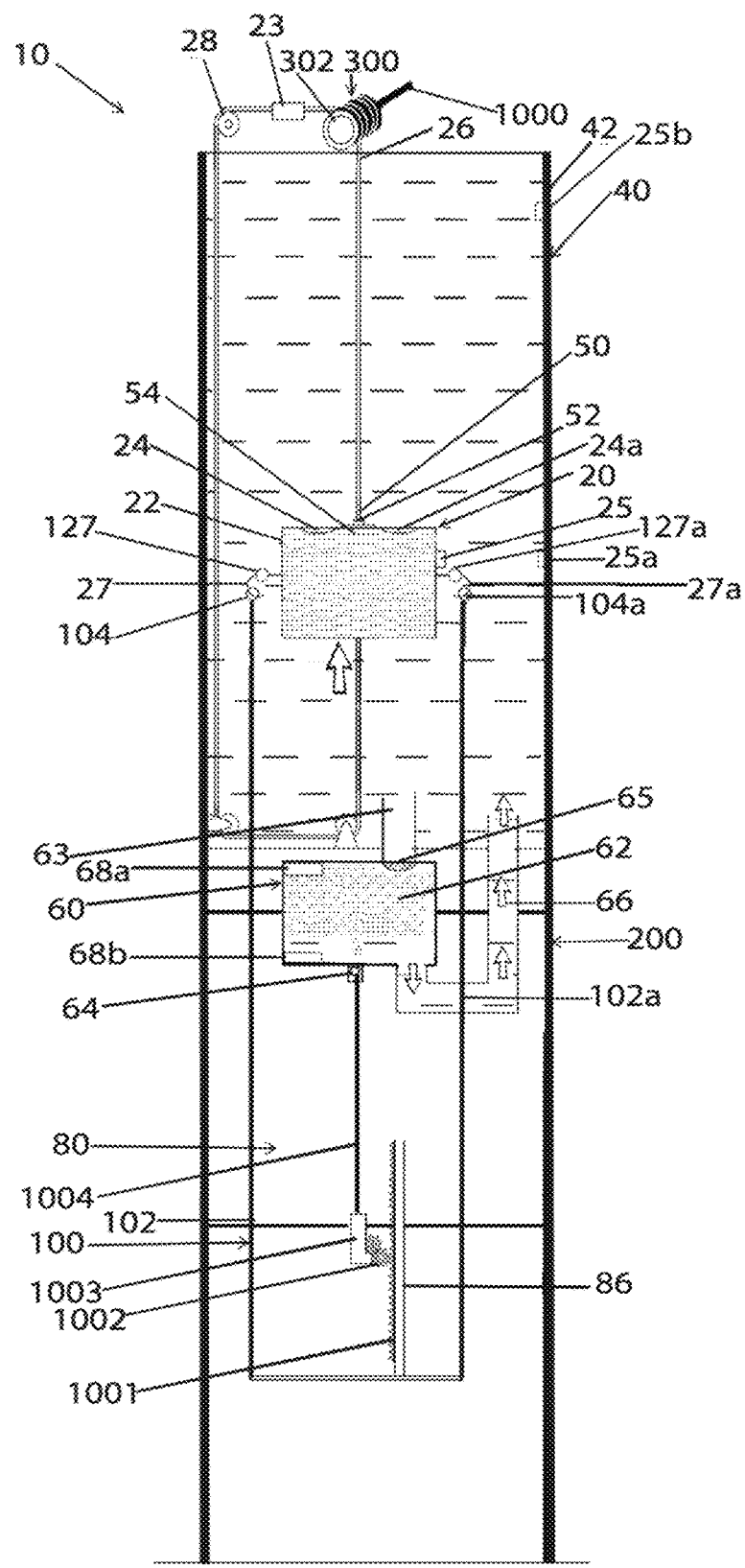
FIG. 4 shows a front elevational view wherein ballast member 22 is permitted by brake 23 to begin rising bringing rack assembly 100 up with it. Compressor 1003 is stationary but as rack 1001 moves upwards and against compressor 1003 via transmission 1002 it actuates the compressor releasing compressed air into intermediary tank to refill it. Water can be seen displaced through J-pipe 66 back into silo 42.
Figure 5:
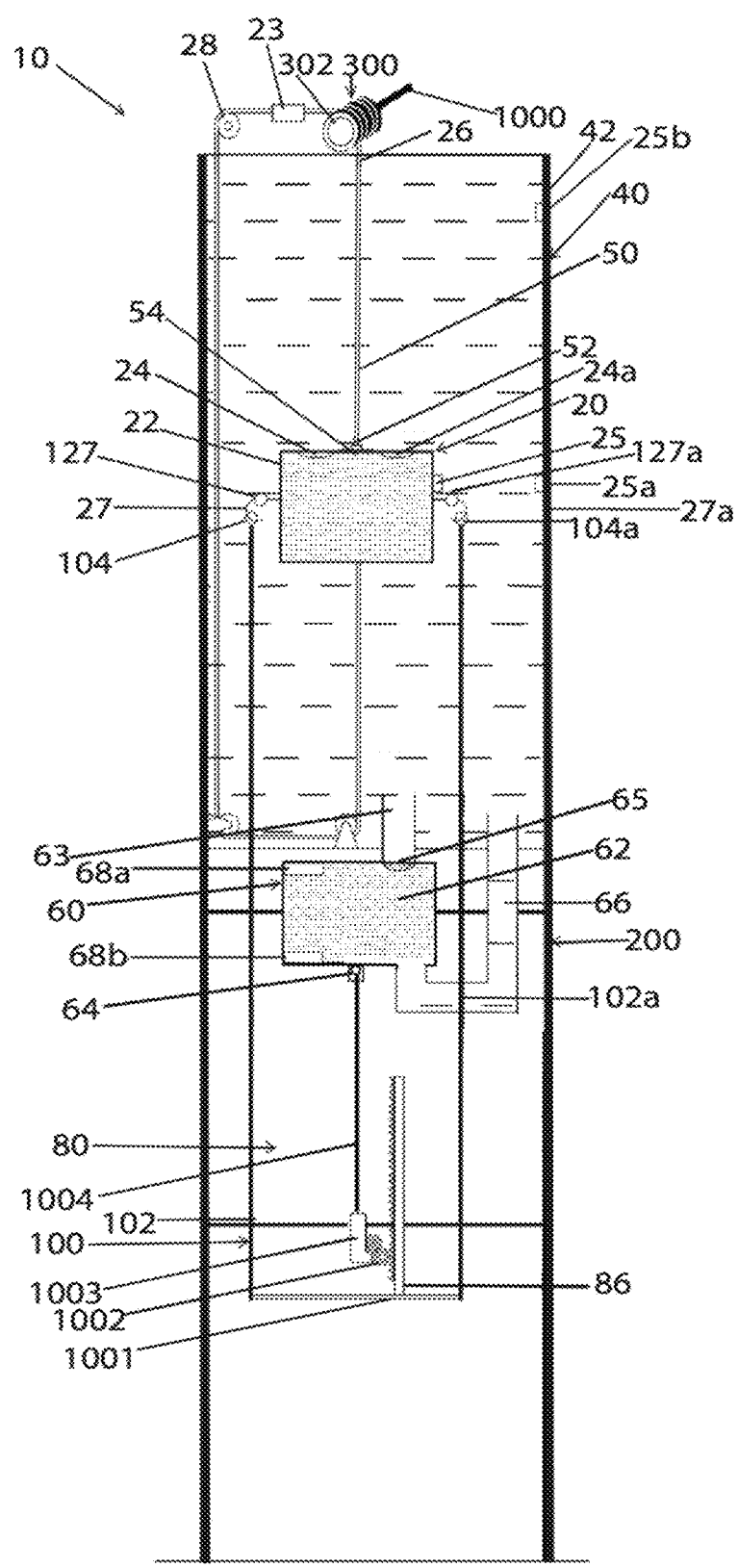
FIG. 5 shows rack assembly 100 at its uppermost point. At this point, latches 27; 27a are about to be released from anchoring members 104; 104a of rack assembly 100. Intermediary tank 62 is now fully filled with compressed air again.
Figure 6:
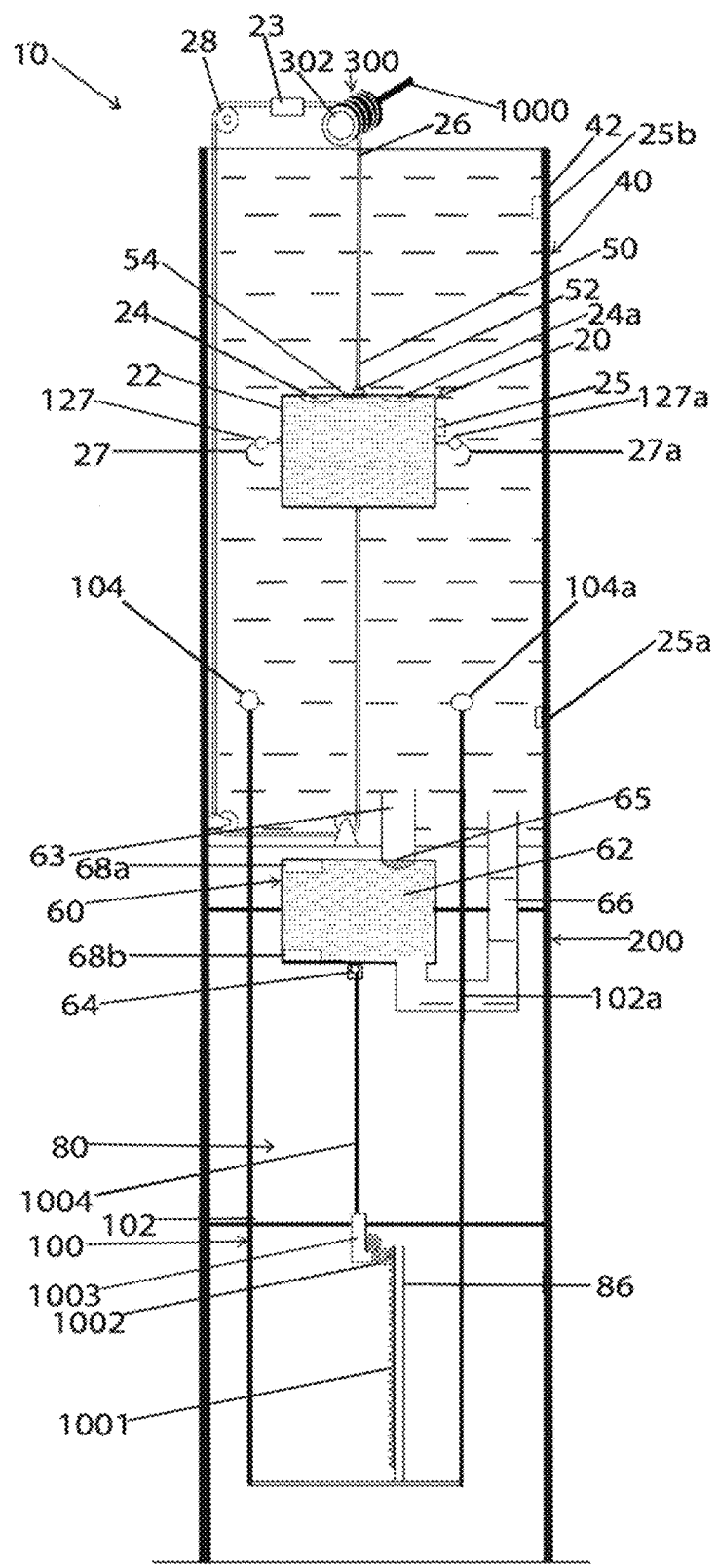
FIG. 6 shows latches 27; 27a now disengaged from anchoring members 104; 104a allowing rack assembly to drop to its bottommost position. Ballast member 22 is now rising to the top of silo 42.
Figure 7:
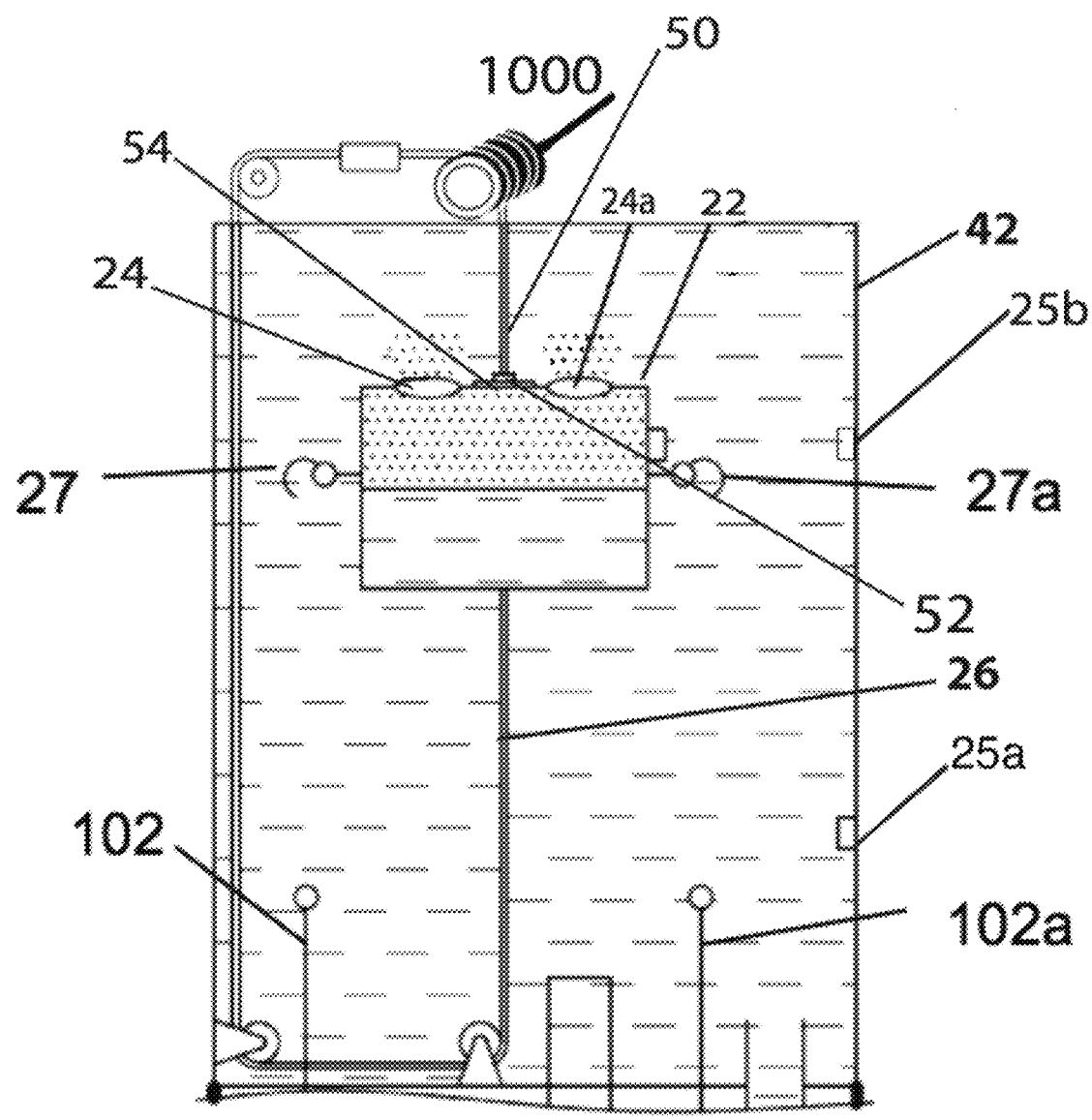
FIG. 7 represents a partial view of the present invention wherein ballast member 22 has risen to the top of silo 42 and valves 24; 24a are now opened allowing water, or any liquid that is used, to flood ballast member 22 and begin sinking it back down to the bottom of silo 42.
Figure 8:
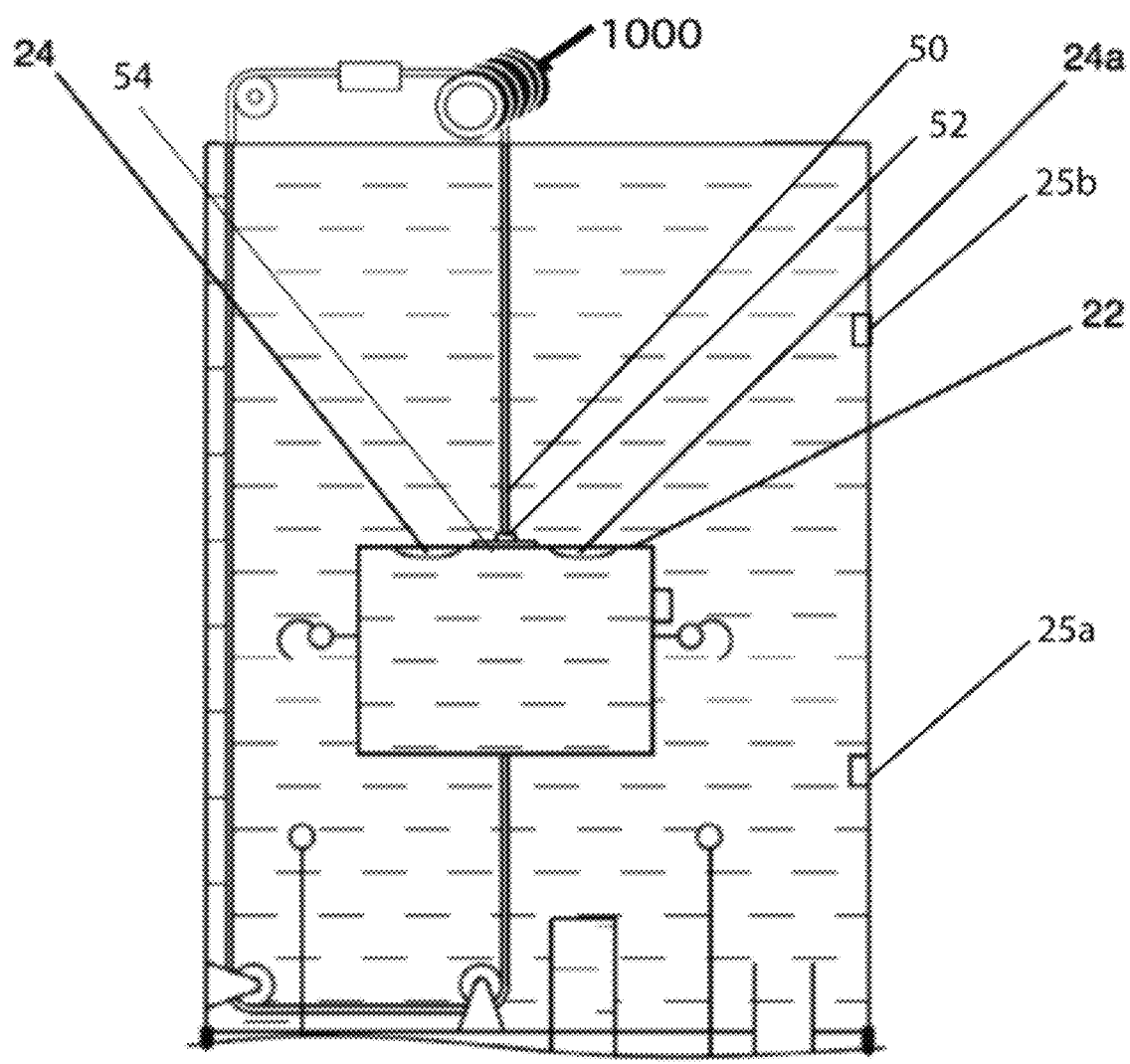
Figure 9:
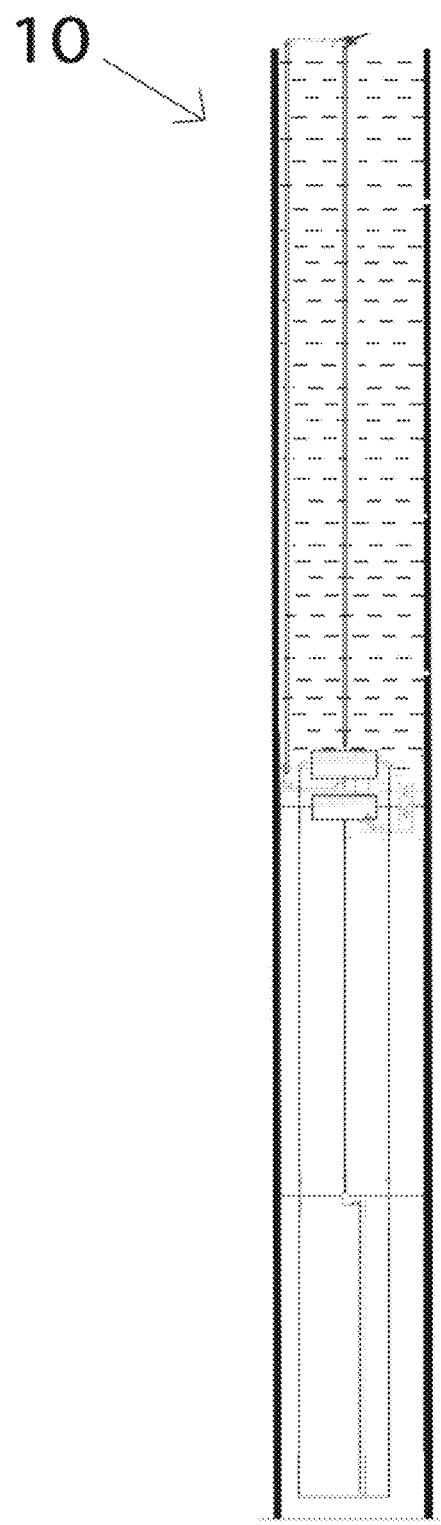
FIG. 9 shows a view of the present invention with the proportions that can be used.
Figure 10:
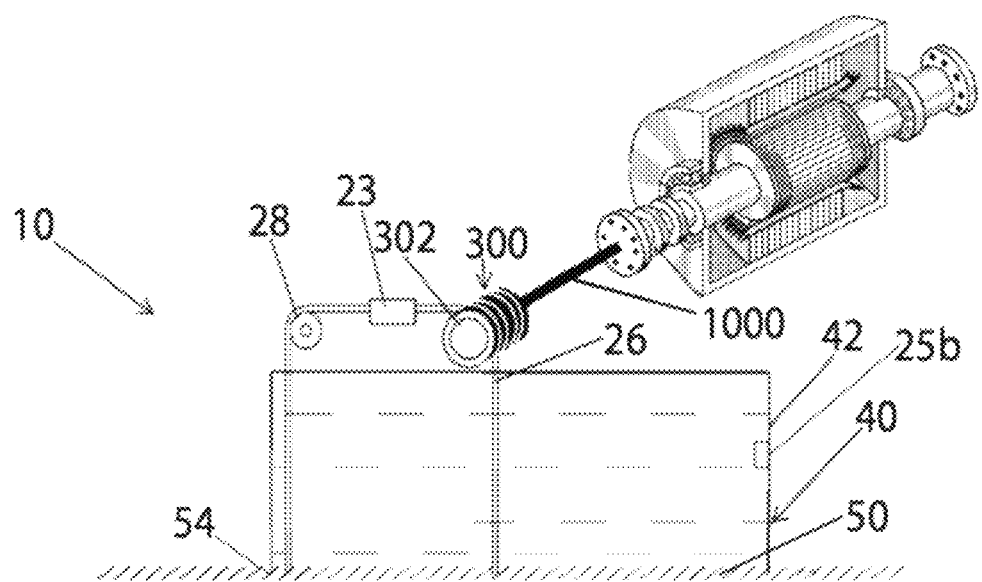
FIG. 10 illustrates an embodiment of the present invention wherein shaft 1000 is used to actuate an alternator.
Figure 11:
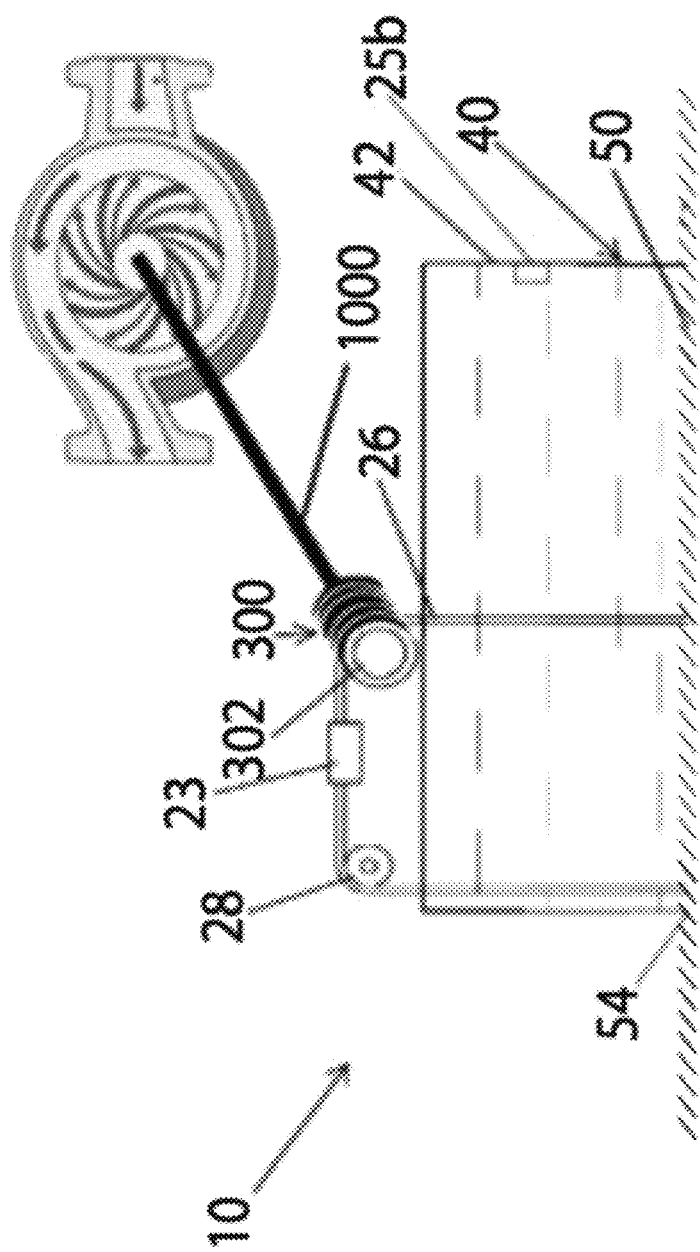
FIG. 11 illustrates an embodiment of the present invention wherein shaft 1000 is used to actuate a centrifugal pump.
Figure 12:
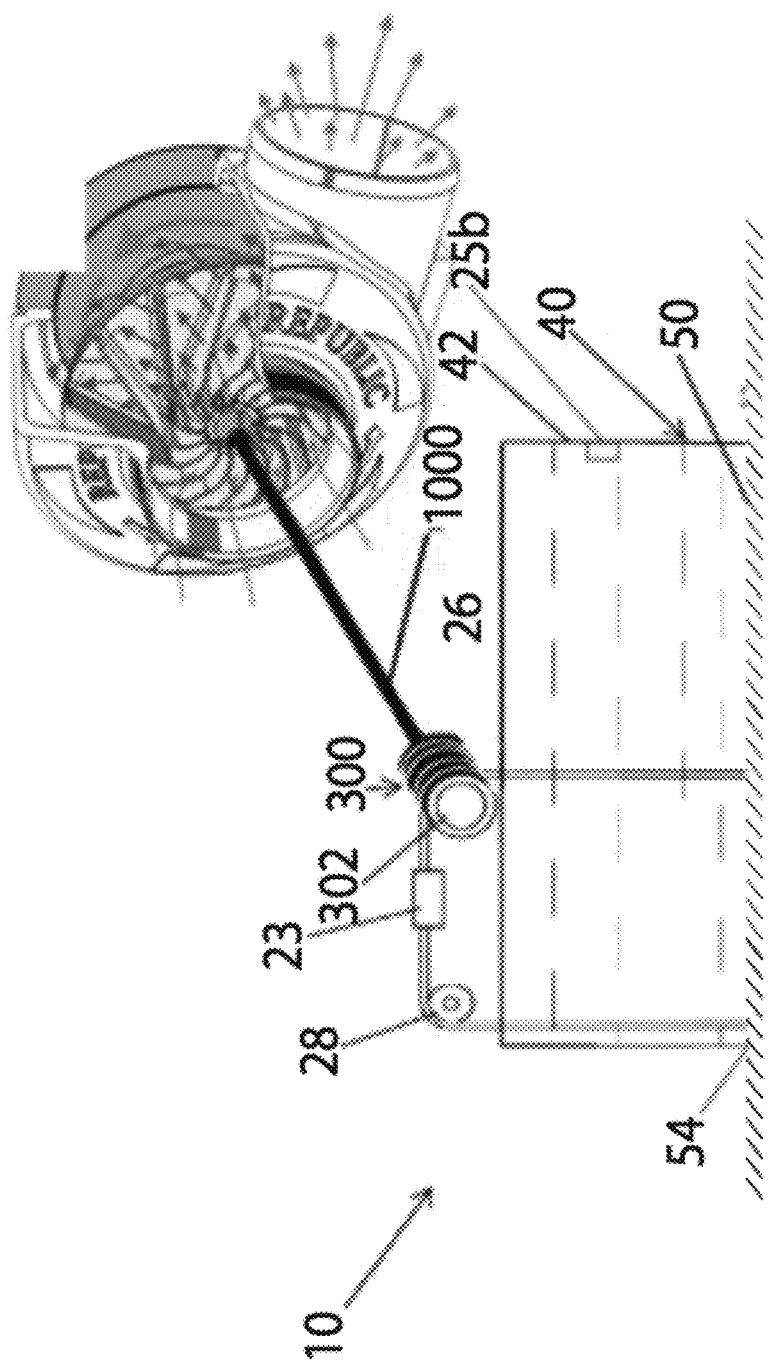
FIG. 12 illustrates an embodiment of the present invention wherein shaft 1000 is used to actuate a centrifugal blower.
Figure 13:
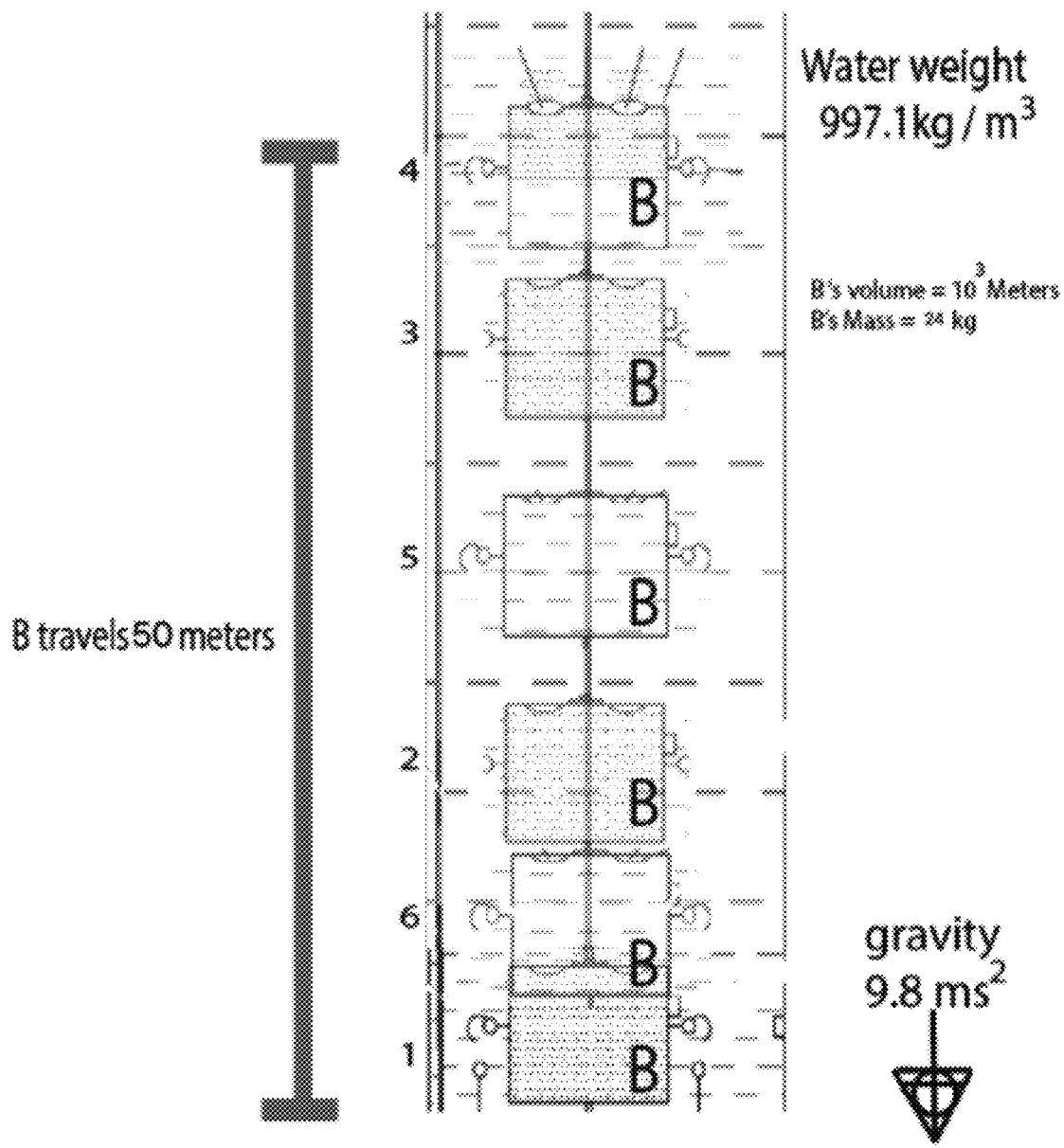
FIG. 13 Shows the phase in which the air filled ballast is released from the latching assembly and rises, transferring power from the Ballast's positive buoyancy to the power output shaft, for use in whatever system the output shaft is connected to. This phase can go on for as long as is required the per the requirements of the system to which it is connected. The system's output can be modulated by modifying the speed at which the Ballast rises through the partial engagement of the brake. It can operate in slow cycles for use in electrical generation, or in fast cycles for use in high demand situations. However, the output speed of the rising ballast is limited by the water resistance around the ballast when it rises, promoting it's use for more torque intensive procedures. Upon the ballast reaching the top of the tank, valves on it's topmost position are opened. This lets out any air contained within it's chamber allowing it to descend to the bottom of the tank.
Figure 14:
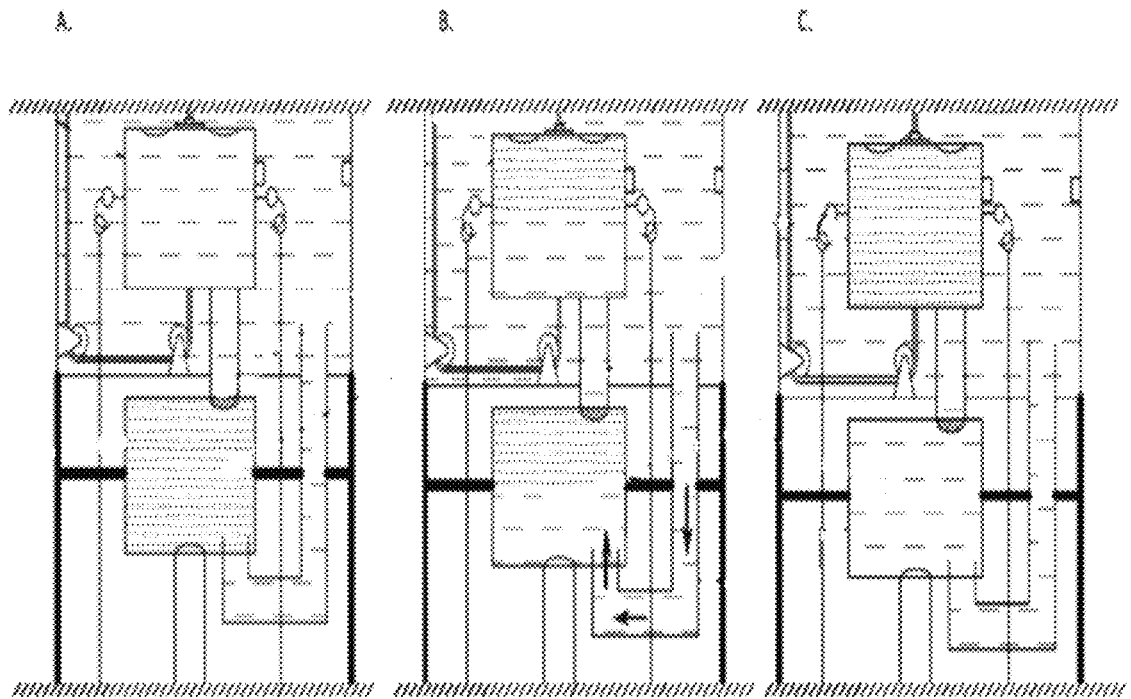
FIG. 14 Shows the ballast refilling phase having three distinct stages labeled A, B, and C respectively.
A: The ballast has just reached the bottom of the tank and has latched onto the assembly, also the brake is fully engaged, thus preventing the ballast from moving.
B: The remote valve located in between the intermediary tank and the ballast tank is opened, allowing an exchange of air and water to take place between the intermediary tank and the ballast. Water can be seen entering the intermediary tank from the main tank by the presence of arrows in the J-pipe. Water enters the chamber through the J-Pipe and pushes the air from the intermediary tank into the ballast tank.
C: Illustrates the finished exchange, specifically, the air filled ballast and the water filled intermediary tank.
Figure 15:
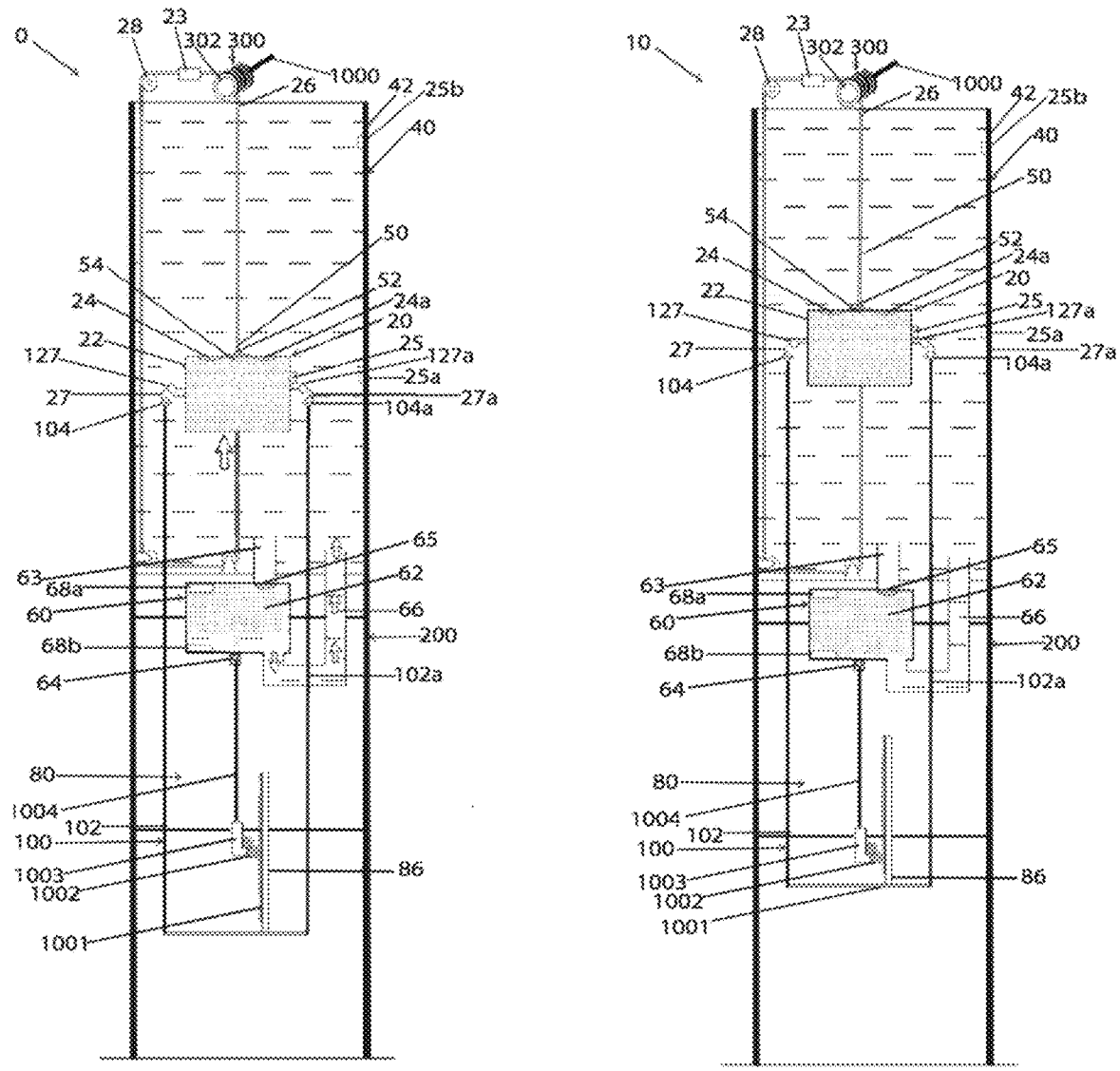
FIG. 15 Shows the intermediary refilling phase that is powered by the positive buoyancy of the ballast, 9946 Kg of buoyance respectively. The bottommost point of the tank is 100 meters, specifically, 99 meters for the height of the tank, and 1 meter for the height of the intermediary tank. Under 100 meters of fresh water, the total pressure equals 9.672 atmospheres or 142.121 psi. In order to refill the intermediary tank, the speed at which the ballast rises is manipulated. This is done through the use of a brake which slows the rise of the ballast to a predetermined speed, and also thorough the use of a gear train to convert the buoyancy force into the proper format to be received for use by the compressor.
Figure 16:
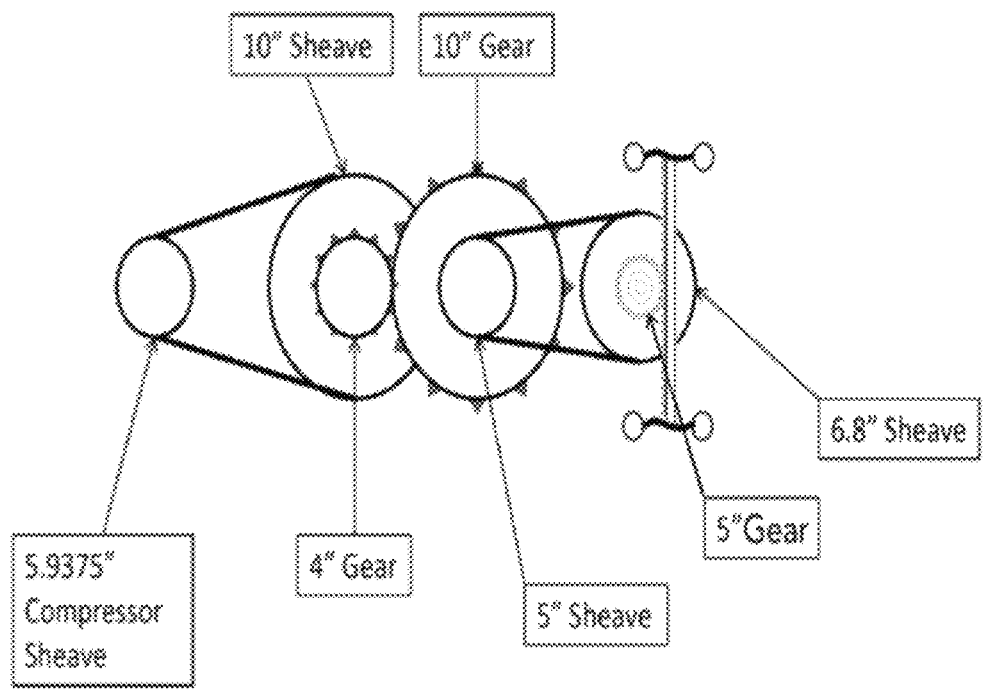
FIG. 16 Shows a side view of an embodiment for a gear train wherein through partial engagement of the brake, the ballast is permitted to rise at a rate of 2 inches per second, which rotates a gear with a radius of 5 inches. The 5" radius gear has a sheave/gear attached to it which has a radius of 6.8", this uses either a chain or a v-belt to rotate the attached sheave/gear that has a radius of 5". This sheave/gear is attached to the inner portion of a larger gear, which has a radius of 10". This 10" gear is meshed with a smaller 4" gear. The 4" gear is attached to a gear of 10" that uses a v-belt to run the compressors sheave of 5.9375". This system procures the final result of 1750 RPM to the 5.9375 inch sheave. (Ingersoll-Rand 2475) The compressor runs on 7.5 hp, which is 5595 Watts. Which means it requires 30.53 Joules of energy through torsion. Therefore, the tension on the belt running the 5.9375" compressor sheave clockwise should be around 404.9 Newtons, which is the equivalent of 91 lbf. This means the gears meshed would have a force of 1012.2 Newtons between them, which is equivalent to 227.5 lbf. Therefore, the tension in the V-Belt being driven counter clockwise should be approximately 2024.4 Newtons, which is 454.9 lbf. Therefore, the tension in the line needed for this to occur will have to be reduced to 2753.2 Newtons, which is 618.7 lbf. The mass itself puts an initial tension of 97,580.1 Newtons in the line, which is nearly 21,930 lbf. This breaking mechanism is designed to reduce the speed of the falling mass also reduces the tension in the line by 94,826.9 Newtons (21,309.4 lbf). It is implied that the breaking mechanism is strong enough to withstand these tensions.
Figure 17:
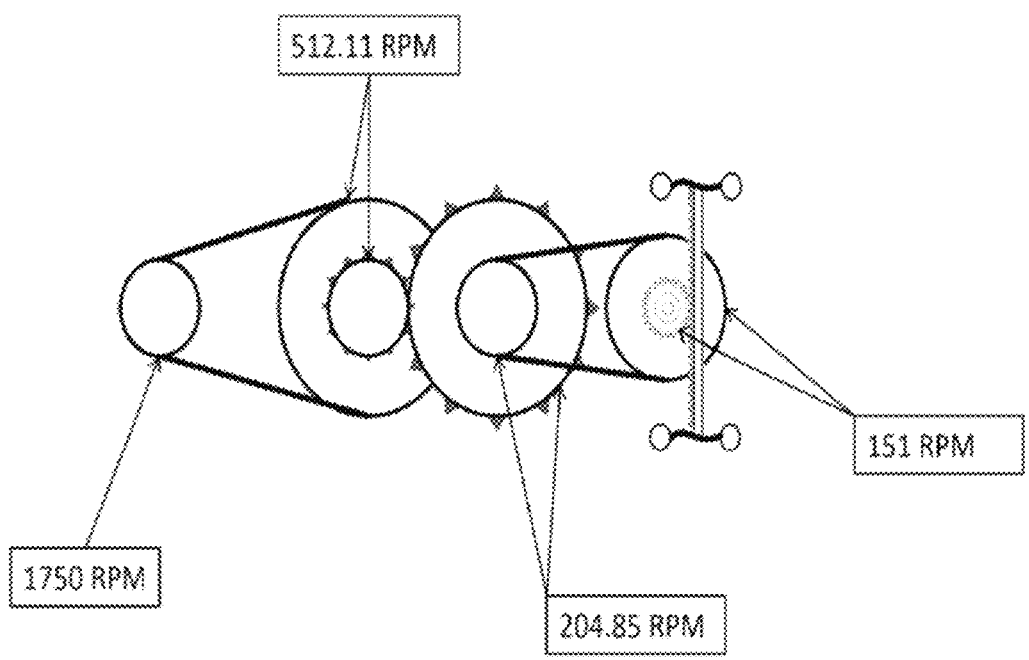
FIG. 17 Shows an alternate view of FIG. 16.

In order to refill the intermediary tank, the speed at which the ballast rises is manipulated. This is done through the use of a brake which slows the rise of the ballast to a predetermined speed, and also thorough the use of a gear train to convert the buoyancy force into the proper format to be received for use by the compressor. FIG. 4 and FIG. 5 show the process by which the intermediary tank is refilled.

One possible embodiment of the gear train for use in converting the ballast's power for use by the compressor is as follows:

Through partial engagement of the brake, the ballast is permitted to rise at a rate of 2 inches per second, which rotates a gear with a radius of 5 inches. The 5" radius gear has a sheave/gear attached to it which has a radius of 6.8", this uses either a chain or a v-belt to rotate the attached sheave/gear that has a radius of 5". This sheave/gear is attached to the inner portion of a larger gear, which has a radius of 10". This 10" gear is meshed with a smaller 4" gear. The 4" gear is attached to a gear of 10" that uses a v-belt to run the compressors sheave of 5.9375". This system procures the final result of 1750 RPM to the 5.9375 inch sheave. (Ingersoll-Rand 2475).

The compressor runs on 7.5 hp, which is 5595 Watts. Which means it requires 30.53 Joules of energy through torsion. Therefore, the tension on the belt running the 5.9375" compressor sheave clockwise should be around 404.9 Newtons, which is the equivalent of 91 lbf. This means the gears meshed would have a force of 1012.2 Newtons between them, which is equivalent to 227.5 lbf. Therefore, the tension in the V-Belt being driven counter clockwise should be approximately 2024.4 Newtons, which is 454.9 lbf. Therefore, the tension in the line needed for this to occur will have to be reduced to 2753.2 Newtons, which is 618.7 lbf. The mass itself puts an initial tension of 97,580.1 Newtons in the line, which is nearly 21,930 lbf. This breaking mechanism is designed to reduce the speed of the falling mass also reduces the tension in the line by 94,826.9 Newtons (21,309.4 lbf). It is implied that the breaking mechanism is strong enough to withstand these tensions.

This system condition is then sustained for 972 seconds, 50 meters of upward ballast travel.

The upward velocity of the ballast is: 0.05144 (m/s). Which is 5.144 cm/s, which is equivalent to 2.03 (in/s).

Since the ballast displaces 10 cubic meters (353.147 cubic feet). The water inside the intermediary tank is under 9.67 atmospheres or a pressure of 142.1 PSI. The compressor cited is capable of moving 24 cubic feet of air per minute at a pressure of 175 psi when operating at 7.5 horse power.

Simple division allows us to find for how long we must thus run the compressor in order to refill the intermediary tank, which is 16.172 minutes or 972 seconds.

Note that 388.147 cubic feet equals 11 cubic meters, an extra cubic meter of air is added to intermediary tank to ensure that the intermediary tank indeed becomes sufficiently filled and to account for any air leaks or otherwise loss of air though any component.

Since the upward velocity of the ballast is 2.08 inches per second we multiply the total seconds required by the compressor by the amount the ballast has to travel in order to find the total travel by the ballast to operate the compressor for said time.

From the bottom of the water tank to the height of 50.118 meters, the latches are engaged to the ballast as is drives the air compressor consuming 618.7 lbs of buoyancy force. This 618.7 lbs of force is subtracted from the 21,930 lbs of total buoyancy force produced by the ballast equaling 21,311.3 lbs. After reaching said height and the latches disengaging, the remaining 48.882 meters have a buoyance force of 21,930.

Thus, for the 99 meters of travel, the ballast travels upward and is totally engaged to a power output of any kind, providing its buoyancy torque of 21,930 lbs or 21,311 lbs to an electrical generating alternator, centrifugal water pump, centrifugal air pump, or any other process which requires a rotating shaft with sustained torque. Furthermore, it would not be uncommon for 2 or more of my systems to work in unison, linked together through a transmission allowing for a more continuous output, but this is beyond the scope of this explanation as 1 system alone provides sufficient utility in generating electricity for use on a public grid or for pumping water or air, in or out of a large mine.

The following is an important note on the system's overall efficiency. There can be no doubt that earth's gravitational acceleration is what provides the buoyancy force to objects. This buoyancy to the ballast thus powers the compressor and refills the intermediary tank during its upward travel and thus allows for another power cycle, as described in the explanation. We can affirm that this system for converting acceleration to rotation is wholly not an isolated system, gravity may be an unconventional power input but is one none the less when used in this manner. Also since any energy can be transformed, and an acceleration is a form of energy, I believe that the efficiency in which this transformation from acceleration to rotation occurs, can be improved further within the parameters of my invention, simply by using the same parts but with different specs.

Also, the compressor's output is cited at 175 psi, yet a pressure of only 146 psi is needed in order to overcome the pressure inside the intermediary tank. Therefore, according to Boyles Law as the air enters into the intermediary tank, the volumetric constraint of the air leaving the compressor will change. As it's pressure changes from 175 psi to 146 psi it will increase volumetrically by 20%. Thus the compressor will truly only need to pump 8.35 cubic meters of air or work for 737 seconds.

The specification of the manufacturer and model number for various assemblies of the present invention are:
Compressor: Ingersoll-Rand 2475;
Latches: Sea Catch TRIO;
Brake: GEMCO ET30 (3 units in parallel);
One-time air filling of Ballast Tank on date of machine manufacturing: <6 kwh (energy cost).
Power Input:
Acceleration, Gravitational, 9.807 meters per second$^2$ This system condition is then sustained for 972 seconds, 50 meters of upward ballast travel.

The upward velocity of the ballast is: 0.05144 (m/s). Which is 5.144 cm/s, which is equivalent to 2.03 (in/s).

Since the ballast displaces 10 cubic meters (353.147 cubic feet). The water inside the intermediary tank is under 9.67 atmospheres or a pressure of 142.1 PSI. The compressor cited is capable of moving 24 cubic feet of air per minute at a pressure of 175 psi when operating at 7.5 horse power.

Simple division allows us to find for how long we must thus run the compressor in order to refill the intermediary tank.

Note that 388.147 cubic feet equals 11 cubic meters, an extra cubic meter of air is added to intermediary tank to ensure that the intermediary tank indeed becomes sufficiently filled and to account for any air leaks or otherwise loss of air though any component.

Since the upward velocity of the ballast is 2.08 inches per second we multiply the total seconds required by the compressor by the amount the ballast has to travel in order to find the total travel by the ballast to operate the compressor for said time.

From the bottom of the water tank to the height of 50.118 meters, the latches are engaged to the ballast as is drives the air compressor consuming 618.7 lbs of buoyancy force. This 618.7 lbs of force is subtracted from the 21,930 lbs of total buoyancy force produced by the ballast equaling 21,311.3 lbs. After reaching said height and the latches disengaging, the remaining 48.882 meters have a buoyance force of 21,930.

Thus, for the 99 meters of travel, the ballast travels upward and is totally engaged to a power output of any kind, providing its buoyancy torque of 21,930 lbs or 21,311 lbs to an electrical generating alternator, centrifugal water pump, centrifugal air pump, or any other process which requires a rotating shaft with sustained torque. Furthermore, it would not be uncommon for 2 or more of my systems to work in unison, linked together through a transmission allowing for a more continuous output, but this is beyond the scope of this explanation as 1 system alone provides sufficient utility in generating electricity for use on a public grid or for pumping water or air, in or out of a large mine.

The following is an important note on the system's overall efficiency. There can be no doubt that earth's gravitational acceleration is what provides the buoyancy force to objects. This buoyancy to the ballast thus powers the compressor and refills the intermediary tank during its upward travel and thus allows for another power cycle, as described in the explanation. We can affirm that this system for converting acceleration to rotation is wholly not an isolated system, gravity may be an unconventional power input but is one none the less when used in this manner. Also since any energy can be transformed, and an acceleration is a form of energy, I believe that the efficiency in which this transformation from acceleration to rotation occurs, can be improved further within the parameters of my invention, simply by using the same parts but with different specs.

Also, the compressor's output is cited at 175 psi, yet a pressure of only 146 psi is needed in order to overcome the pressure inside the intermediary tank. Therefore, according to Boyles Law as the air enters into the intermediary tank, the volumetric constraint of the air leaving the compressor will change. As it's pressure changes from 175 psi to 146 psi it will increase volumetrically by 20%. Thus the compressor will truly only need to pump 8.35 cubic meters of air or work for 737 seconds.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for converting acceleration to rotational energy comprising, a ballast assembly initially filled with compressed air connected to an intermediary tank assembly, said ballast assembly including at least one ballast valve, a silo assembly filled with a predetermined amount of liquid, said intermediary tank having a J-pipe that extends from said intermediary tank assembly to said silo assembly, said ballast assembly housed within said silo assembly, said ballast assembly having a cable mounted thereon that is wrapped around a wire drum that in turn rotates a shaft member, a compressor, a rack assembly that actuates said compressor using a transmission member, means for engaging said ballast member to said rack assembly, a brake member mounted to the cable that controls the movement of said cable.

2. The system of claim 1 wherein said ballast includes at least one sensor.

3. The system of claim 1 wherein said silo includes at least one sensor.

4. The system of claim 1 wherein said intermediary tank includes at least one float sensor.

5. The system of claim 4 wherein said intermediary tank includes an upper and lower float sensor.

6. The system of claim 1 wherein said means for engaging is at least one latch.

7. The system of claim 1 wherein said ballast includes at least one ballast sensor and at least one latch; said silo member includes a top and bottom silo sensor; and said rack assembly including at least one anchoring member.

8. The system of claim 7 wherein said anchoring member engages with said at least one latch upon said ballast sensor aligning with said bottom silo sensor and said at least one ballast valve allowing liquid in upon said ballast sensor aligning with said upper silo sensor.

9. The system of claim 1 wherein said cable includes a first and second end, said ballast member including an outer top wall and an inner top wall, said first end mounted to said outer top wall and said second end mounted to said inner top wall after passing around said wire drum and at least one pulley.

10. The system of claim 1 wherein said means for engaging is at least one hook.

11. The system of claim 1 wherein a ballast member is open at the bottom.

12. The system of claim 1 wherein the rotation of said shaft actuates a centrifugal pump.

13. The system of claim 1 wherein the rotation of said shaft actuates a centrifugal air blower.

14. The system of claim 1 wherein the rotation of said shaft actuates an alternator.

15. The system of claim 7 wherein when said ballast member is at the bottom of said silo and full of liquid, said means for engaging and said brake do not allow said ballast to rise, said brake is selectively released to allow said ballast member to rise thereby raising said rack assembly which in turn actuates said compressor to release compressed air back into said intermediary tank, upon said bottom float sensor detecting insufficient liquid, compressed air will cease being delivered and said means for engaging will disconnect allowing said ballast member to rise and allow cable to generate rotational energy to be transferred to said shaft.

16. The system of claim 1 wherein said compressor, said silo, and said intermediate tank are mounted to a mounting assembly that stabilizes the system with respect to the ground or adjacent wall.

17. The system of claim 7 using a method of converting acceleration to rotational energy comprising the steps of:
   a) having a ballast member filled with compressed air in its initial phase with said engaging means and said brake member locking said ballast member in place at the bottom of said silo assembly;
   b) said brake member selectively releasing said cable member allowing said ballast to rise;
   c) said ballast rising and thereby rising said rack assembly;

d) said rack assembly including a rack member that rises, said rack member includes teeth that cooperate with the gears of a transmission that in turn is coupled to said compressor and actuates it to release compressed air into an intermediary tank assembly through a first pipe and displacing water within said intermediary tank back into said silo assembly using said J-pipe;

e) said engaging means and said brake releasing said ballast member upon said bottom float sensor detecting insufficient liquid indicating that said intermediary tank is filled with compressed air;

f) said cable spinning around said wire drum upon said ballast member ascending through said silo assembly;

g) said at least one ballast valve allowing water inside said ballast member upon said ballast member detecting said upper silo sensor;

h) said ballast member sinking back down to the bottom of said silo assembly;

i) said engaging means and said brake member locking again said ballast member at the bottom of said silo member upon said ballast sensor detecting said bottom silo sensor;

j) said compressed air within said intermediary tank being released into said ballast member using a second pipe upon said ballast sensor detecting said bottom silo sensor.

* * * * *